(12) United States Patent
Zhao et al.

(10) Patent No.: US 10,042,443 B2
(45) Date of Patent: Aug. 7, 2018

(54) WEARABLE TOUCH DEVICE AND WEARABLE TOUCH METHOD

(71) Applicant: BOE TECHNOLOGY GROUP CO., LTD., Beijing (CN)

(72) Inventors: Tianyue Zhao, Beijing (CN); Yanshun Chen, Beijing (CN); Qiushi Xu, Beijing (CN); Yaohui Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 49 days.

(21) Appl. No.: 14/436,911

(22) PCT Filed: Aug. 20, 2014

(86) PCT No.: PCT/CN2014/084820
§ 371 (c)(1),
(2) Date: Apr. 20, 2015

(87) PCT Pub. No.: WO2015/165175
PCT Pub. Date: May 11, 2015

(65) Prior Publication Data
US 2016/0124524 A1 May 5, 2016

(30) Foreign Application Priority Data
Apr. 28, 2014 (CN) .......................... 2014 1 0175468

(51) Int. Cl.
*G06F 3/045* (2006.01)
*G06F 3/038* (2013.01)
(Continued)

(52) U.S. Cl.
CPC .......... *G06F 3/0383* (2013.01); *G06F 3/0325* (2013.01); *G06F 3/03547* (2013.01);
(Continued)

(58) Field of Classification Search
CPC .. G06F 3/0383; G06F 3/03547; G06F 3/0425; G06F 3/0325; G06F 3/042; G06F 2203/0331; G06F 3/0426; G06F 3/0317
See application file for complete search history.

(56) References Cited

U.S. PATENT DOCUMENTS 6,771,294 B1 8/2004 Pulli et al.
2006/0055672 A1* 3/2006 Krocker ................ G06F 3/0304
345/158

(Continued)

FOREIGN PATENT DOCUMENTS

CN 201548938 U 8/2010
CN 101859209 A 10/2010
(Continued)

OTHER PUBLICATIONS

International Search Report dated Jan. 26, 2015 in corresponding International Application PCT/CN2014/084820 including English translation of the Written Opinion.
(Continued)

*Primary Examiner* — Ibrahim A Khan
(74) *Attorney, Agent, or Firm* — Nath, Goldberg & Meyer; Joshua B. Goldberg

(57) ABSTRACT

A wearable touch device comprising a carrier, a pattern emitting unit, an image acquisition unit, an image monitoring unit and a processing unit, the carrier is wearable, the pattern emitting unit emits a scanning pattern to a touch surface capable of being touched by a touch end, the image acquisition unit is used for acquiring an image formed by projecting the scanning pattern on the touch surface and sending image information of the acquired image to the processing unit, the image monitoring unit is used for monitoring current light energy of the scanning pattern in regions of the touch surface and sending current light energy information to the processing unit, and the processing unit is
(Continued)

used for processing the image information of the acquired image and the current light energy information to determine a touch position of the touch end on the touch surface and generate corresponding command information.

14 Claims, 2 Drawing Sheets

(51) Int. Cl.
  *G06F 3/042* (2006.01)
  *G06F 3/03* (2006.01)
  *G06F 3/0354* (2013.01)
(52) U.S. Cl.
  CPC ............ *G06F 3/042* (2013.01); *G06F 3/0425* (2013.01); *G06F 2203/0331* (2013.01)

(56) References Cited

U.S. PATENT DOCUMENTS

| | | | | |
|---|---|---|---|---|
| 2008/0018591 | A1* | 1/2008 | Pittel | ............... G06F 1/1616 345/156 |
| 2011/0254810 | A1 | 10/2011 | Lee et al. | |
| 2012/0162140 | A1 | 6/2012 | Lee et al. | |
| 2012/0218184 | A1* | 8/2012 | Wissmar | ............... G06F 3/0346 345/158 |
| 2012/0249409 | A1* | 10/2012 | Toney | ............... G06F 3/017 345/156 |
| 2013/0044054 | A1 | 2/2013 | Lee et al. | |
| 2013/0314380 | A1* | 11/2013 | Kuribayashi | ......... G06F 3/0425 345/175 |
| 2014/0055352 | A1 | 2/2014 | Davis et al. | |
| 2014/0098067 | A1 | 4/2014 | Yang et al. | |
| 2015/0054730 | A1* | 2/2015 | Kodama | ................ G09G 3/001 345/156 |

FOREIGN PATENT DOCUMENTS

| | | |
|---|---|---|
| CN | 101963868 A | 2/2011 |
| CN | 102915153 A | 2/2013 |
| CN | 203178918 | 9/2013 |
| CN | 203287855 | 11/2013 |
| CN | 103546181 A | 1/2014 |
| JP | H01262803 A | 10/1989 |
| JP | 2014-48691 A | 3/2014 |
| JP | 2014048691 A | 3/2014 |
| KR | 10-2009-0061179 A | 6/2009 |
| KR | 10-2012-0071551 A | 7/2012 |
| WO | 02073387 A1 | 9/2002 |
| WO | 2009/075433 A1 | 6/2009 |
| WO | 2009075433 A1 | 6/2009 |

OTHER PUBLICATIONS

Xiang, Binbin, "Study of Touch-screen Technology Based on Image Detection Technology", Jul. 15, 2013 including English abstract.
First Office Action dated Jun. 2, 2016 corresponding to Chinese application No. 201410175468.4.
Second Office Action dated Dec. 30, 2016, in corresponding Korean Application No. 10-2015-7012703.
Office action dated Jan. 22, 2018 for corresponding JP application No. 2017-508720 with English translation.
Partial supplementary European search report dated Dec. 13, 2017 for corresponding application No. 14859317.1.
Extended European Search Report dated Mar. 27, 2018 in corresponding European Patent Application No. EP 14859317.1.

* cited by examiner

WEARABLE TOUCH DEVICE AND WEARABLE TOUCH METHOD

This is a National Phase Application filed under 35 U.S.C. 371 as a national stage of PCT/CN2014/084820, filed Aug. 20, 2014, and claims priority benefit from Chinese Application No. 201410175468.4, filed Apr. 28, 2014, the content of each of which is hereby incorporated by reference in its entirety.

FIELD OF THE INVENTION

The present invention relates to the field of control technology, and particularly relates to a wearable touch device and a wearable touch method.

BACKGROUND OF THE INVENTION

With the development of science and technology, wearable technology appears currently. In short, the wearable technology refers to science and technology of exploring and creating equipment capable of being directly worn on body or integrated into clothes or accessories of users. Wearable intelligent equipment has become a new technological favorite and a development trend of future intelligent equipment.

The wearable intelligent equipment is a general term of wearable equipment (such as glasses, gloves, watches, clothing, etc) developed by performing intelligent design on daily wear by adopting the wearable technology. The wearable intelligent equipment includes: wearable intelligent equipment (such as intelligent watches or intelligent glasses, etc) with complete functions, large sizes and capable of achieving all or a part of intelligent functions without relying on smartphones; and wearable intelligent equipment (such as all kinds of intelligent bracelets, intelligent jewelries and the like used for monitoring signs and symptoms) only focused on a certain kind of intelligent application functions and needing to be cooperatively used with other equipment (such as smartphones). With the progress of technology and the change of user demands, the forms and application hotspots of the wearable intelligent equipment change continuously.

However, the existing wearable touch devices generally use a key control manner, namely achieving touch by means of touch screens. In view of the small volume demands of the wearable touch devices, the general touch screens cannot well meet the user demands. Moreover, touch ends need to directly contact the existing wearable touch devices (i.e., the keys or touch screens thereof) to perform touch, such that the touch experience of the wearable touch devices is poor. Therefore, convenient wearable touch devices and methods capable of being touched by users without keys or touch screens become the technical problem to be solved urgently at present.

SUMMARY OF THE INVENTION

The technical problem to be solved by the present invention is to provide a wearable touch device and a wearable touch method for overcoming the above-mentioned defects in the prior art, the wearable touch device may be touched by a user without a key or a touch screen, and is small in volume and convenient to carry, and the corresponding wearable touch method is accurate in touch and wide in application range.

The technical solution adopted to solve the technical problem in the present invention is a wearable touch device, comprising a carrier, a pattern emitting unit, an image acquisition unit, an image monitoring unit and a processing unit, wherein the carrier is wearable; the pattern emitting unit is used for emitting a scanning pattern to a touch surface capable of being touched by a touch end; the image acquisition unit is used for acquiring an image formed by projecting the scanning pattern on the touch surface and sending image information of the acquired image to the processing unit; the image monitoring unit is used for monitoring current light energy of the scanning pattern in regions of the touch surface and sending current light energy information to the processing unit; the processing unit is used for processing the image information of the acquired image and the current light energy information to determine a touch position of the touch end on the touch surface and generate corresponding command information.

Preferably, both of the pattern emitting unit and the image acquisition unit are provided on the carrier and are located in the same area of the carrier.

Preferably, the pattern emitting unit is an infrared projection type pattern emitting unit, the image acquisition unit is an infrared image acquisition unit, and the image monitoring unit is an infrared image monitoring unit.

Preferably, the scanning pattern emitted by the pattern emitting unit is a grid-shaped pattern.

Preferably, the processing unit includes a comparison module and a command module, the image information of the acquired image includes the image coordinate information of the acquired image, and a mapping table of position coordinate and command information, and the initial light energy information and the pattern coordinate information of the scanning pattern are pre-stored in the processing unit;

the comparison module is used for respectively comparing the image coordinate information of the acquired image and the current light energy information with the pattern coordinate information and the initial light energy information of the scanning pattern to obtain determined touch position coordinate information;

the command module is used for converting the received determined touch position coordinate information into corresponding command information according to the mapping table of position coordinate and command information.

Preferably, the wearable touch device further includes an execution unit, the execution unit is used for executing a corresponding action according to the received command information.

Preferably, the touch end is a human finger, and the touch surface capable of being touched by the touch end is a region capable of being touched by the human finger.

Preferably, the pattern emitting unit, the image acquisition unit, the image monitoring unit and the processing unit are provided on the carrier.

Preferably, the pattern emitting unit, the image acquisition unit and the image monitoring unit are provided on the outer surface layer of the carrier close to the palm side.

Preferably, the outer surfaces of the pattern emitting unit, the image acquisition unit and the image monitoring unit are respectively flush with the outer surface of the carrier.

Preferably, the wearable touch device includes a plurality of carriers, the pattern emitting unit and the image acquisition unit are provided on one carrier, and the image monitoring unit and the processing unit are provided on another carrier.

Preferably, the carrier has a shape of a closed ring, and the carrier is made of PVC material.

The technical solution adopted to solve the technical problem in the present invention is a wearable touch method, comprising steps of: emitting a scanning pattern to a touch surface capable of being touched by a touch end; acquiring an image formed by projecting the scanning pattern on the touch surface, and simultaneously monitoring current light energy information of the scanning pattern in regions of the touch surface; processing image information of the acquired image and the current light energy information to determine a touch position of the touch end on the touch surface and generate corresponding command information.

Preferably, the image information of the acquired image includes the image coordinate information of the acquired image, and a mapping table of position coordinate and command information, and the initial light energy information and the pattern coordinate information of the scanning pattern are preset, the step of determining the touch position of the touch end on the touch surface and generating corresponding command information includes the following steps: comparing the current light energy information in a region of the touch surface with the initial light energy information of the scanning pattern, and primarily determining that the region comprises an approximate touch point when the change of the current light energy information with respect to the initial light energy information is larger than or equal to a set value; comparing the image coordinate information of the acquired image in the region with the pattern coordinate information of the scanning pattern, and determining a coordinate point as an actual touch point when a change occurs between the acquired image and the scanning pattern at the corresponding coordinate change, so as to obtain the coordinate of the touch position; and obtaining the command information corresponding to the coordinate of the touch position according to the mapping table of position coordinate and command information.

Preferably, the set value is 5%.

Preferably, the wearable touch method further includes a step of executing a corresponding action according to the command information corresponding to the coordinate of the touch position.

In the embodiments of the present invention, the wearable touch device may be a closed ring-shaped intelligent wearable device capable of being worn on the human finger, the pattern emitting unit emits a particular pattern to the touch surface capable of being touched by the touch end (for example, human finger). When the finger touches, the image acquisition unit acquires the image formed by projecting the particular pattern on the touch surface where the finger touches, the image monitoring unit monitors the current light energy information of the formed image, and the processing unit analyzes and processes the current light energy information and the image information of the acquired image to determine the coordinate of the touch position of the finger and judge the accurate touch position of the finger, so as to perform touch feedback. The wearable touch device may allow the user to perform touch operations without a key or a touch screen, and is small in volume and convenient to carry, and the corresponding wearable touch method is accurate in touch and has a wide range of application.

DETAILED DESCRIPTION OF THE EMBODIMENTS

To make those skilled in the art better understand the technical solutions of the present invention, the wearable touch device and the wearable touch method in the present invention will be further described below in detail in combination with the accompanying drawings and specific implementations.

According to an aspect of the present invention, there is provided a wearable touch device comprising a carrier, a pattern emitting unit, an image acquisition unit, an image monitoring unit and a processing unit, wherein the carrier is wearable; the pattern emitting unit is used for emitting a scanning pattern to a touch surface capable of being touched by a touch end; the image acquisition unit is used for acquiring an image formed by projecting the scanning pattern on the touch surface and sending image information of the acquired image to the processing unit; the image monitoring unit is used for monitoring current light energy of the scanning pattern in regions of the touch surface and sending current light energy information to the processing unit; the processing unit is used for processing the image information of the acquired image and the current light energy information to determine a touch position of the touch end on the touch surface and generate corresponding command information.

According to another aspect of the present invention, there is provided a wearable touch method comprising steps of: emitting a scanning pattern to a touch surface capable of being touched by a touch end; acquiring an image formed by projecting the scanning pattern on the touch surface, and simultaneously monitoring current light energy information of the scanning pattern in regions of the touch surface; processing image information of the acquired image and the current light energy information to determine a touch position of the touch end on the touch surface and generate corresponding command information.

In the embodiments of the present invention, the user can perform touch operations without directly contacting the wearable touch device, the wearable touch device is small in volume and convenient to carry, and the corresponding wearable touch method is accurate in touch and has a wide range of application.

First Embodiment

This embodiment provides a wearable touch device and a corresponding wearable touch method.

Figure 1:
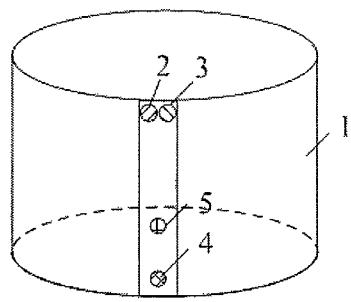
FIG. 1 is a schematic diagram of a structure of a wearable touch device in a first embodiment of the present invention.

As shown in FIG. 1, the wearable touch device in this embodiment comprises a carrier 1, a pattern emitting unit 2, an image acquisition unit 3, an image monitoring unit 4 and a processing unit 5.

The carrier 1 is wearable, for example, on a human finger.

The pattern emitting unit 2 is used for emitting a scanning pattern to a touch surface capable of being touched by a touch end.

The image acquisition unit 3 is used for acquiring an image formed by projecting the scanning pattern on the touch surface and sending image information of the acquired image to the processing unit 5.

The image monitoring unit 4 is used for monitoring current light energy of the scanning pattern in regions of the touch surface and sending current light energy information to the processing unit 5.

The processing unit 5 is used for processing the image information of the acquired image and the current light energy information to determine a touch position of the touch end on the touch surface and generate corresponding command information.

Preferably, both the pattern emitting unit 2 and the image acquisition unit 3 are provided on the carrier 1 and are located in the same area of the carrier 1, namely a pattern emitting part and an image receiving part are included in the same area, so as to facilitate the fixed-point recognition and comparison of the emitted scanning pattern and the received acquired image. In this embodiment, as shown in 1, the carrier 1 preferably has the shape of a closed ring, the image monitoring unit 4 is also provided on the carrier 1, the pattern emitting unit 2 and the image acquisition unit 3 are provided at one end of the carrier 1, and the image monitoring unit 4 is provided at the opposite other end of the carrier 1.

The pattern emitting unit 2 is an infrared projection type pattern emitting unit, the image acquisition unit 3 is an infrared image acquisition unit, for example, a camera, it can be understood that, the camera can be a rotatable camera for ensuring the normal work of the pattern emitting unit 2, the image acquisition unit 3 and the image monitoring unit 4 when the relative position of the touch device and the touch surface changes. The image monitoring unit 4 is an infrared image monitoring unit, for example, an optical sensor. In addition, for example, the scanning pattern emitted by the pattern emitting unit 2 is a grid-shaped pattern, namely in this embodiment, the scanning pattern emitted by the pattern emitting unit 2 is an infrared grid pattern, namely an infrared matrix pattern. Since the infrared pattern emitting unit 2, image acquisition unit 3 and image monitoring unit 4 matched with each other are adopted, when the wearable touch device is used, touch operation can be achieved without direct contact between the touch end and the touch device, thus the touch is more flexible.

Preferably, the above-mentioned units are implemented by microchips with small volumes to ensure a small volume, in order to guarantee the small volume and carrying convenience of the wearable touch device.

Also preferably, the carrier 1 may be made of PVC material. The material is firm and insulated, such that the structures and positions of the units provided therein are stable, in order to ensure the effective work of the wearable touch device and ensure the human safety.

In this embodiment, the touch end may directly contact the touch surface or not, and the touch surface may be a regular plane, an irregular plane or a curved surface. Any plane, irregular plane with concave points and convex points or curved surface may be regarded as a plane when the area thereof is small enough and has corresponding coordinate information. It can be understood that, when the touch end is not in direct contact with the touch surface, although the touch position may be determined according to the current light energy information and the image information of the acquired image, since there may be a certain distance between the touch end and the touch surface, a certain error exists between the projection of the touch end on the touch surface and the actual touch point, thus the calculated touch position may have a certain touch positioning error. It is easy to understand that, when the touch end is in direct contact with the touch surface, since the projection of the touch end on the touch surface is basically consistent with the actual touch point, the touch positioning is more accurate.

In an application example, the touch end 7 (see FIG. 3) is a finger of one human hand, the carrier 1 is worn on the finger of the other human hand, and the region capable of being touched by the touch end 7 is the palm of the hand wearing the carrier 1. In another application example, the touch end 7 is the finger of one human hand, the carrier 1 is worn on the finger serving as the touch end 7, and the region capable of being touched by the touch end 7 is the palm of the other human hand. In general, the smaller the distance from the carrier 1 to the region capable of being touched by the touch end 7 or to the touch end 7 is, the more accurate the change of the light energy obtained by the image monitoring unit 4 is, and the more accurate the touch positioning is.

Correspondingly, the pattern emitting unit 2, the image acquisition unit 3, the image monitoring unit 4 and the processing unit 5 are provided in the carrier 1, and the pattern emitting unit 2, the image acquisition unit 3 and the image monitoring unit 4 are provided on the outer surface layer of the carrier 1 close to the palm side. Preferably, the outer surfaces of the pattern emitting unit 2, the image acquisition unit 3 and the image monitoring unit 4 are flush with the outer surface of the carrier 1.

In the wearable touch device of this embodiment, the processing unit 5 further comprises a comparison module and a command module (not shown in FIG. 1), the image information of the acquired image includes the image coordinate information of the acquired image, and a mapping table of position coordinate and command information, and the initial light energy information and the pattern coordinate information of the scanning pattern are pre-stored in the processing unit 5, the comparison module is used for respectively comparing the image coordinate information of the acquired image and the current light energy information with the pattern coordinate information and the initial light energy information of the scanning pattern to obtain determined touch position coordinate information; the command module is used for converting the received determined touch position coordinate information into corresponding command information according to the mapping table of position coordinate and command information. Preferably, the processing unit 5 may be implemented by a microprocessor (for example, single chip).

Further, the wearable touch device further comprises an execution unit, the execution unit is used for executing a corresponding action according to the received command information.

Figure 2:
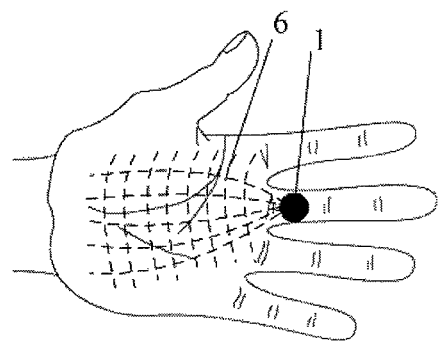
FIG. 2 is a working schematic diagram of the wearable touch device in FIG. 1.
Figure 3:
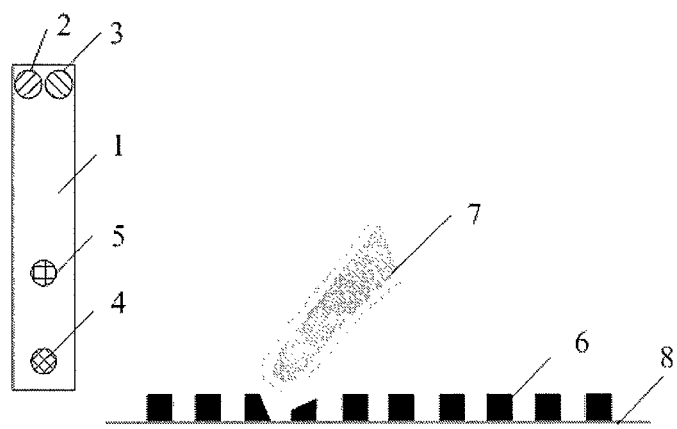
FIG. 3 is a touch schematic diagram of the wearable touch device in FIG. 1.

For example, as shown in FIG. 2, the pattern emitting unit 2 (e.g., infrared grid projection unit) in the carrier 1 and the image acquisition unit 3 (e.g., infrared camera) for acquiring the image are installed at the side of the carrier 1 close to the palm, when the wearable touch device is at a standby state or a working state, the pattern emitting unit 2 continuously emits infrared grid projections to the touch surface (for example, the palm of the hand wearing the carrier 1), for example, projecting an infrared grid 6 on the palm of the hand wearing the carrier 1 and serving as the touch surface 8 (see FIG. 3). As shown in FIG. 3, when the touch surface 8 is touched and when the touch end 7 (e.g., human finger) falls within a certain region in the infrared grid range, a part of infrared light forming the infrared grid pattern is obscured, on one hand, the infrared grid pattern where the finger touches is obscured to generate light energy change (i.e., generating light dissipation or loss), the current light energy is detected by the image monitoring unit 4 (for example, optical sensor), namely the current light energy information is monitored; on the other hand, the image acquisition unit 3 detects the change of the infrared grid pattern where the finger touches, namely acquiring the image formed by projecting the infrared grid pattern on the touch surface 8.

The initial light energy information of the scanning pattern and the pattern coordinate (infrared grid coordinate in this embodiment) of the scanning pattern are preset in the processing unit 5, the current light energy information monitored by the image monitoring unit 4 and the image coordinate information of the acquired image acquired by the image acquisition unit 3 are fed back to the processing unit 5, the comparison module in the processing unit 5 processes and analyzes the current light energy information and the image coordinate information of the acquired image, and primarily determines that a certain region includes an approximate touch point when the change of the current light energy information of the region with respect to the initial light energy information is larger than or equal to a set value (for example 5%); further, the comparison module compares the image coordinate information of the acquired image with the pattern coordinate information of the scanning pattern, and may determine a coordinate point as the actual touch point when a change occurs between the acquired image and the scanning pattern at the corresponding coordinate, so as to obtain the corresponding coordinate of the touch position; and the command information corresponding to the coordinate of the touch position is obtained according to the mapping table of position coordinate and command information.

By adopting the wearable touch device, when the finger touches, the image monitoring unit senses the light energy change and sends the light energy change information to the processing unit, so as to determine the generation of a touch action and primarily determine a certain region as an approximate region including the touch position according to the size relationship between the light energy change and the set value; meanwhile, the image acquisition unit obtains a projection image formed by the scanning pattern obscured by the finger, accordingly records the image coordinate information of the acquired image, and compares the image coordinate information with the pattern coordinate information of the scanning pattern to determine a corresponding coordinate at which the change occurs between the acquired image and the scanning pattern, so as to obtain an accurate touch position.

It should be understood that, the pattern emitting unit 2, the image acquisition unit 3 and the image monitoring unit 4 may be units of manners other than the infrared manners, as long as they can be matched with each other, and the specific forms thereof are not limited. The particular pattern emitted by the pattern emitting unit 2 can also be patterns other than the grid pattern, and the particular pattern can be set flexibly in specific application, which will not be repeated redundantly herein.

Correspondingly, this embodiment provides a wearable touch method, including the following steps of:

emitting a scanning pattern to a touch surface capable of being touched by a touch end;

acquiring an image formed by projecting the scanning pattern on the touch surface, and simultaneously monitoring current light energy information of the scanning pattern in regions of the touch surface;

processing image information of the acquired image and the current light energy information to obtain image change and light energy change, so as to determine a touch position of the touch end on the touch surface and generate corresponding command information;

further, executing a corresponding action according to the command information corresponding to the touch position.

In the method, the image information of the acquired image includes the image coordinate information of the acquired image, and a mapping table of position coordinate and command information, and the initial light energy information and the pattern coordinate information of the scanning pattern are preset, and in the method, the step of determining the touch position of the touch end on the touch surface and generating corresponding command information includes the following steps of:

comparing the current light energy information in a certain region of the touch surface with the initial light energy information of the scanning pattern, and primarily determining that the region includes an approximate touch point when the change of the current light energy information with respect to the initial light energy information is larger than or equal to a set value;

comparing the image coordinate information of the acquired image in the region with the pattern coordinate information of the scanning pattern, and determining a coordinate point as an actual touch point when a change occurs between the acquired image and the scanning pattern at the corresponding coordinate, so as to obtain the coordinate of the touch position;

obtaining the command information corresponding to the coordinate of the touch position according to the mapping table of position coordinate and command information.

Figure 4:
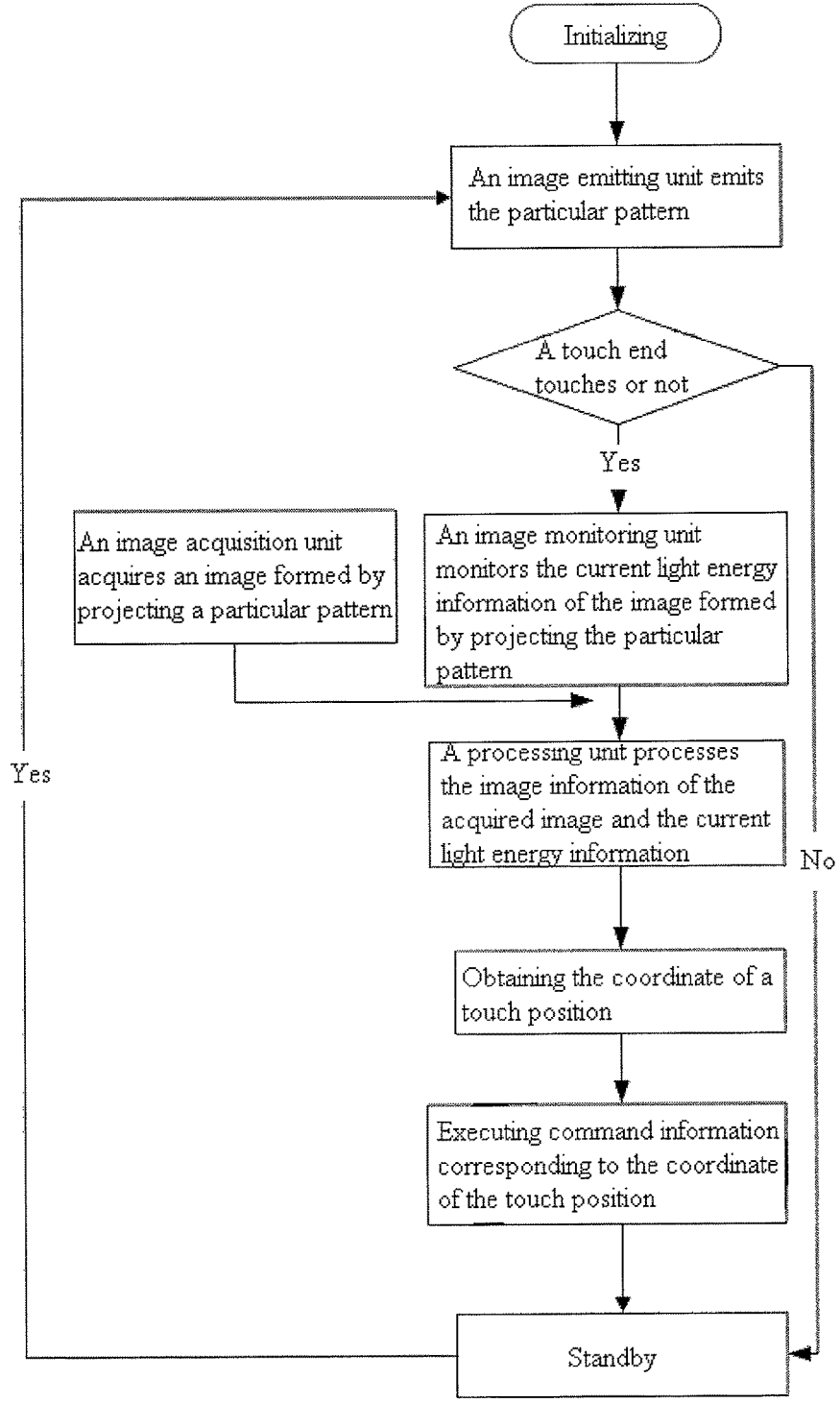
FIG. 4 is a touch flowchart of a wearable touch method in the first embodiment of the present invention.

FIG. 4 shows a touch flowchart of the wearable touch method.

For example, the wearable touch device is worn on the human finger through the carrier 1, and the initial light energy information and the pattern coordinate information of the particular pattern are set in a startup initialization process.

For example, the pattern emitting unit 2 projects an infrared grid pattern to the palm serving as the touch surface 8.

When no touch end 7 (for example, human finger) touches, the wearable touch device is kept at the standby state.

When the human finger touches, the infrared grid pattern changes, the image acquisition unit 3 (for example, camera) acquires the image formed by projecting the infrared grid pattern where the human finger touches, and meanwhile, the image monitoring unit 4 (for example, optical sensor) monitors the current light energy information in the infrared grid pattern.

The image coordinate information of the acquired image formed when the human finger touches and the current light energy information are transmitted to the processing unit 5 to be processed and analyzed. Firstly, the current light energy information is compared with the initial light energy information to determine the generation of a touch action, and a certain region is primarily determined as an approximate region including the touch position according to the size relationship between the light energy change and the set value; and then, further according to the comparison of the image coordinate information of the acquired image and the pattern coordinate information of the scanning pattern, when the change occurs between the acquired image and the scanning pattern at a corresponding coordinate (for example, central coordinate), the coordinate point is determined as the actual touch point, so as to obtain the coordinate of an accurate touch position; and then a touch command is executed according to the command information corresponding to the coordinate of the touch position.

Second Embodiment

This embodiment provides a wearable touch device and a corresponding wearable touch method, and compared with the first embodiment, the units in the wearable touch device can be separately provided on more than one carrier. Namely, in the first embodiment, the pattern emitting unit, the image acquisition unit, the image monitoring unit and the processing unit are provided in the same carrier; while in this embodiment, the pattern emitting unit and the image acquisition unit can be provided in one carrier, and the image monitoring unit and the processing unit are provided in another carrier.

In this embodiment, the carrier includes a first carrier and a second carrier, and the first carrier and the second carrier are made of the same material. For example, the pattern emitting unit and the image acquisition unit can be provided on the first carrier and are located in the same area of the first carrier; while the image monitoring unit and the processing unit are provided on the second carrier, the first carrier and the second carrier can be worn on the same hand or two hands of the same person, or can be worn on the hands of different persons.

The configuration of the units in the wearable touch device of this embodiment is the same as the configuration of the corresponding units in the first embodiment, and will not be repeated redundantly herein.

The corresponding wearable touch method in this embodiment is the same as the wearable touch method in the first embodiment, in which the pattern emitting unit emits the infrared matrix pattern, when the human finger touches some points of the infrared matrix pattern of the touch surface, the image monitoring unit monitors the loss (light energy change) of the infrared light at these points, and in accordance with the change of the infrared grid pattern, where the finger touches, acquired by the image acquisition unit, the processing unit analyzes and processes according to the light energy change and the pattern change, to judge the specific touch position to obtain an accurate touch point coordinate so as to obtain the command information corresponding to the touch point coordinate.

The wearable touch device in the present invention can be a closed ring-shaped intelligent wearable device capable of being worn on the human finger, the pattern emitting unit emits the particular pattern to the touch surface capable of being touched by the touch end. When the finger touches, the image acquisition unit acquires the image formed by projecting the particular pattern where the finger touches, the image monitoring unit monitors the current light energy information of the image, and the processing unit analyzes and processes the image information of the acquired image and the current light energy information to determine the coordinate of the touch position of the finger and judge the accurate touch position of the finger, so as to perform touch feedback. The wearable touch device may allow the user to perform touch operations without a key or a touch screen, and is small in volume and convenient to carry, and the corresponding wearable touch method is accurate in touch and has a wide range of application.

It can be understood that, the foregoing implementations are merely exemplary implementations used for illustrating the principle of the present invention, rather than limiting the present invention. Those of ordinary skill in the art may make various variations and improvements without departing from the spirit and essence of the present invention, and these variations and improvements should be encompassed in the protection scope of the present invention.

The invention claimed is:

1. A wearable touch device, comprising:
a carrier that is wearable;
a pattern emitting chip that is configured to emit a scanning pattern to a touch surface capable of being touched by a touch end;
an image acquisition chip that is configured to acquire an image formed by projecting the scanning pattern on the touch surface and sending an image information of the acquired image to a processor;
an image monitoring chip that is configured to monitor a current light energy of the scanning pattern in regions of the touch surface and send a current light energy information to the processor; and
the processor that is configured to process the image information of the acquired image and the current light energy information to determine a touch position of the touch end on the touch surface and generate a corresponding command information,
wherein:
the image information of the acquired image comprises image coordinate information of the acquired image, and the processor is further configured to pre-store a mapping table of position coordinate and command information, and an initial light energy information and a pattern coordinate information of the scanning pattern;
the processor is further configured to first compare the current light energy information with the initial light energy information of the scanning pattern and then, in a case where a change of the current light energy information with respect to the initial light energy information in a region of the touch surface is larger than or equal to a set value, determine that the region is a region comprising an approximate touch point,
once the region comprising the approximate touch point is determined, the processor is further configured to then compare the image coordinate information of the acquired image in the region comprising the approximate touch point with the pattern coordinate information of the scanning pattern in the region comprising the approximate touch point to determine whether a change occurs between the image coordinate information of the acquired image and the pattern coordinate information of the scanning pattern at any corresponding coordinate within the region comprising the approximate touch point; and, in a case where a change occurs between the acquired image and the scanning pattern at a corresponding coordinate within the region comprising the approximate touch point, determine the corresponding coordinate as a coordinate of the touch point; and
the processor is further configured to convert the coordinate of the touch position into the corresponding command information according to the mapping table of position coordinate and command information.

2. The wearable touch device of claim 1, wherein both of the pattern emitting chip and the image acquisition chip are provided on the carrier and are located in the same area of the carrier.

3. The wearable touch device of claim 1, wherein the pattern emitting chip is an infrared projection type pattern emitting chip, the image acquisition chip is an infrared image acquisition chip, and the image monitoring chip is an infrared image monitoring chip.

4. The wearable touch device of claim 1, wherein the scanning pattern emitted by the pattern emitting chip is a grid-shaped pattern.

5. The wearable touch device of claim 1, further comprising an execution chip, wherein the execution chip is configured to execute a corresponding action according to the received command information.

6. The wearable touch device of claim 1, wherein the touch end is a human finger, and the touch surface capable of being touched by the touch end is a region capable of being touched by the human finger.

7. The wearable touch device of claim 1, wherein the pattern emitting chip, the image acquisition chip, the image monitoring chip and the processor are provided on the carrier.

8. The wearable touch device of claim 7, wherein the carrier is worn on a finger of a human hand, and wherein the pattern emitting chip, the image acquisition chip and the image monitoring chip are provided on the outer surface layer of the carrier close to a palm side of the human hand.

9. The wearable touch device of claim 8, wherein the outer surfaces of the pattern emitting chip, the image acquisition chip and the image monitoring chip are respectively flush with the outer surface of the carrier.

10. The wearable touch device of claim 1, comprising a plurality of carriers, wherein the pattern emitting chip and the image acquisition chip are provided on one carrier, and the image monitor and the processor are provided on another carrier.

11. The wearable touch device of claim 1, wherein the carrier has a shape of a closed ring, and the carrier is made of PVC material.

12. A wearable touch method, comprising steps of:
emitting a scanning pattern to a touch surface capable of being touched by a touch end;
acquiring an image formed by projecting the scanning pattern on the touch surface, and simultaneously monitoring a current light energy information of the scanning pattern in regions of the touch surface; and
processing an image information of the acquired image and the current light energy information to determine a touch position of the touch end on the touch surface and generate a corresponding command information, wherein the image information of the acquired image comprises the image coordinate information of the acquired image, and a mapping table of position coordinate and command information, and the initial light energy information and the pattern coordinate information of the scanning pattern are preset, and the step of determining the touch position of the touch end on the touch surface and generating the corresponding command information comprises:

first comparing the current light energy information with the initial light energy information of the scanning pattern and then, in a case where a change of the current light energy information with respect to the initial light energy information in a region of the touch surface is larger than or equal to a set value, determining that the region is a region comprising an approximate touch point, then comparing the image coordinate information of the acquired image in the region comprising the approximate touch point with the pattern coordinate information of the scanning pattern in the region comprising the approximate touch point once the region comprising the approximate touch point is determined, to determine whether a change occurs between the image coordinate information of the acquired image and the pattern coordinate information of the scanning pattern at any corresponding coordinate within the region comprising the approximate touch point; and, in a case where a change occurs between the acquired image and the scanning pattern at a corresponding coordinate within the region comprising the approximate touch point, determining the corresponding coordinate as a coordinate of the touch position; and obtaining the command information corresponding to the coordinate of the touch position according to the mapping table of position coordinate and command information.

13. The wearable touch method of claim 12, wherein the set value is 5%.

14. The wearable touch method of claim 12, further comprising a step of executing a corresponding operation according to the command information corresponding to the coordinate of the touch position.

* * * * *